US010037652B2

(12) United States Patent
Eby et al.

(10) Patent No.: US 10,037,652 B2
(45) Date of Patent: Jul. 31, 2018

(54) SLOT MACHINE WITH CHARGING PORT FOR MOBILE PHONES

(71) Applicant: Greektown Casino LLC, Detroit, MI (US)

(72) Inventors: Brian Eby, Birmingham, MI (US); Hugh Flack, Troy, MI (US); Anthony Williams, Sterling Heights, MI (US); Adam Suliman, Grosse Pointe Woods, MI (US)

(73) Assignee: Greektown Casino LLC, Detroit, MI (US)

(*) Notice: Subject to any disclaimer, the term of this patent is extended or adjusted under 35 U.S.C. 154(b) by 275 days.

(21) Appl. No.: 14/873,619

(22) Filed: Oct. 2, 2015

(65) Prior Publication Data

US 2016/0098891 A1 Apr. 7, 2016

Related U.S. Application Data

(60) Provisional application No. 62/058,944, filed on Oct. 2, 2014.

(51) Int. Cl.
*A63F 13/00* (2014.01)
*G07F 17/32* (2006.01)

(52) U.S. Cl.
CPC ...... *G07F 17/3216* (2013.01); *G07F 17/3237* (2013.01); *G07F 17/3241* (2013.01); *G07F 17/3244* (2013.01); *G07F 17/3286* (2013.01)

(58) Field of Classification Search
None
See application file for complete search history.

(56) References Cited

U.S. PATENT DOCUMENTS

2006/0199648 A1* 9/2006 Mitchell ................. G07F 17/32 463/46
2013/0303263 A1* 11/2013 LeMay ............... G07F 17/3218 463/25
2014/0228109 A1* 8/2014 Azuma ............... G07F 17/3202 463/29
2014/0354214 A1* 12/2014 Phelps .................... G07F 15/00 320/107
2014/0357353 A1* 12/2014 Popovich ............ G07F 17/3239 463/29

* cited by examiner

*Primary Examiner* — Lawrence Galka
(74) *Attorney, Agent, or Firm* — Honigman Miller Schwartz and Cohn LLP

(57) ABSTRACT

An apparatus is disclosed. The apparatus includes a gaming device and an electronic device interface. The gaming device includes a housing having an least one outer surface. The electronic device interface is removeably-secured to the at least one outer surface of the housing. The electronic device interface includes connection hardware directly connected to the external power source.

6 Claims, 4 Drawing Sheets

SLOT MACHINE WITH CHARGING PORT FOR MOBILE PHONES

CROSS-REFERENCE TO RELATED APPLICATIONS

This U.S. patent application claims priority to U.S. Provisional Application 62/058,944 filed on Oct. 2, 2014 the disclosure of which is considered part of the disclosure of this application and is hereby incorporated by reference in its entirety.

TECHNICAL FIELD

The disclosure relates to a gaming device, an electronic device interface supported by a gaming device, and methodologies for utilizing the same.

BACKGROUND

Gaming devices are known in the art. Some gaming devices permit one or more credits to be wagered on the possibility of a combination of a plurality of characters (e.g., numbers, letters, graphics or symbols) aligning upon one or more pay-lines.

While known gaming devices have proven to be acceptable for various applications, such conventional gaming devices are nevertheless susceptible to improvements that may enhance their overall performance and gaming experience offered to a patron. Therefore, a need exists to develop improved gaming devices that advance the art.

DESCRIPTION OF THE DRAWINGS

The disclosure will now be described, by way of example, with reference to the accompanying drawings, in which.

SUMMARY

Figure 1:
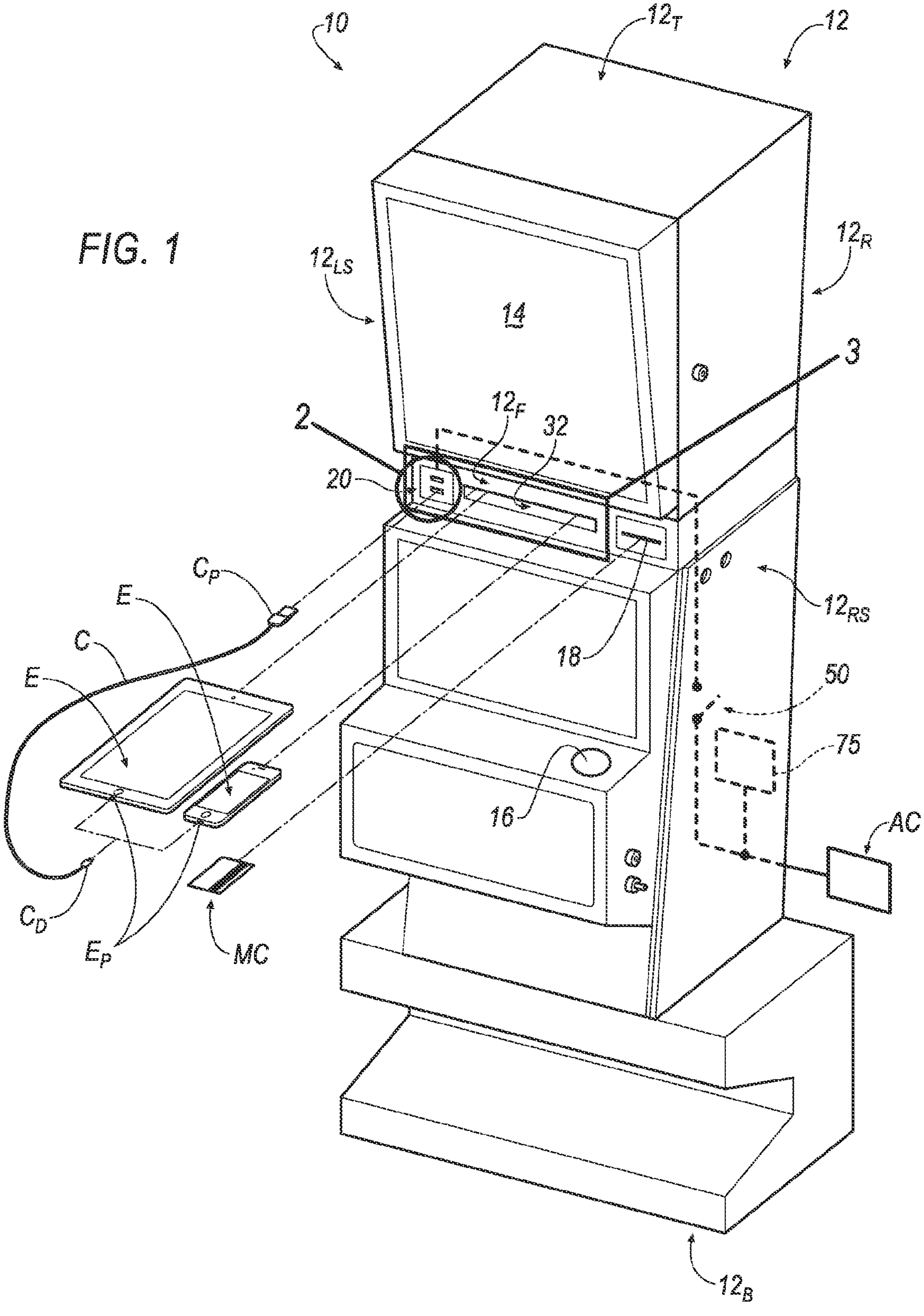
FIG. 1 is a perspective view of an exemplary gaming device.

One aspect of the disclosure provides an apparatus. The apparatus includes a gaming device and an electronic device interface. The gaming device includes a housing having an least one outer surface. The electronic device interface is removeably-secured to the at least one outer surface of the housing. The electronic device interface includes connection hardware directly connected to the external power source.

In some examples, the electronic device interface includes a faceplate that forms one or more fastener passages. The electronic device interface also includes one or more fasteners that are removeably-disposed within the one or more fastener passages for removeably-securing the faceplate to the at least one outer surface of the housing.

In some implementations, the connection hardware is selected from the group consisting of: an universal serial bus (USB) type A connector, an USB type B connector, and an USB type C connector.

In some instances, the at least one outer surface of the housing at least partially defines an electronic device receiving cavity that extends into the housing.

In some examples, the electronic device receiving cavity is defined by a length dimension, a height dimension, and a depth dimension.

In some implementations, the apparatus includes a computing resource and a switch. The computing resource is disposed within the housing. The switch is disposed within the housing and communicatively-coupled to the computing resource. The switch is arrangeable in a closed orientation to permit the connection hardware to be connected to the external power source. The switch is arrangement in an open orientation to permit the connection hardware to be disconnected from the external power source.

In some instances, the computing resource does not contain logic or processing associated with operation of a game of chance provided by the gaming device.

In some examples, the at least one outer surface of the housing at least partially forms a slot sized for receiving an identification card.

Another aspect of the disclosure provides a method including the steps of: hardwire-connecting an electronic device to connection hardware; without a prerequisite, permitting an electronic device to receive power from a power source; and providing power from the power source to the electronic device.

In some examples, the method includes disposing the electronic device within a cavity.

In yet another aspect of the disclosure provides a method including the steps of: hardwire-connecting an electronic device to connection hardware; determining if the electronic device should be granted access to a power source; upon determining that the electronic device should be granted access to the power source, permitting the electronic device to receive power from the power source; and providing power from the power source to the electronic device.

In some examples, the method includes the step of disposing the electronic device within a cavity.

In some implementations, the determining step includes determining that an identification card is removeably-interfaced with a slot.

In some instances, the determining step includes determining that a patron of a gaming device has logged a predetermined amount of play time with the gaming device.

In some examples, the determining step includes determining that a patron of a gaming device has met or exceeded a predetermined amount of play time with the gaming device.

In some implementations, the determining step includes determining that a patron of a gaming device has wagered or lost a predetermined amount of money with the gaming device.

In some instances, the determining step includes determining that a patron of a gaming device has activated an app or software that is running on the electronic device.

DETAILED DESCRIPTION

The figures illustrate an exemplary implementation of a gaming device, an electronic device interface supported by a gaming device, and methodologies for utilizing the same. Based on the foregoing, it is to be generally understood that the nomenclature used herein is simply for convenience and the terms used to describe the invention should be given the broadest meaning by one of ordinary skill in the art.

FIG. 1 illustrates an exemplary implementation of a gaming device, which is shown generally at 10. The gaming device 10 includes a housing 12 that contains electronics and/or mechanical components that compose a game of chance (noting that the electronics associated with the game of chance is not a computing resource 75, which will be described in greater detail in the following disclosure). The housing 12 may be defined by a plurality of side surface portions such as, for example: a front surface portion $\mathbf{12}_F$, a rear surface portion $\mathbf{12}_R$, a top surface portion $\mathbf{12}_T$, a bottom surface portion $\mathbf{12}_B$, a left side surface portion $\mathbf{12}_{LS}$ and a right side surface portion $\mathbf{12}_{RS}$.

An external power source, AC (e.g., alternating current power) is shown connected to, for example, a computing resource 75 that is disposed within the housing 12 of the gaming device 10. The computing resource 75 does not contain logic or processing associated with the operation of a game of chance; rather, the computing resource 75 may detect, for example, if a magnetic strip card, MC, is removeably-interfaced with the housing 12. The computing resource 75 may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)).

In some implementations, the front surface portion $\mathbf{12}_F$ of the housing 12 may support a video monitor 14 that displays features (e.g., a plurality of characters and one or more pay-lines) of the game of chance and an actuator 16 that permits authorization of one or more credits to be spent in exchange for at least one play of the game of chance. The front surface portion $\mathbf{12}_F$ of the housing 12 may also define a slot 18 that permits, for example, the magnetic strip card, MC, to be removeably-interfaced with the slot 18; in some instances the magnetic strip card, MC, may include information related to the patron of the gaming device 10 in order to document and reward the patron in exchange for, for example: (1) a predetermined number or plays on the gaming device 10, (2) an amount of wagers by the patron, (3) winnings awarded to the patron, (4) losses incurred by the patron or the like.

Figure 2:
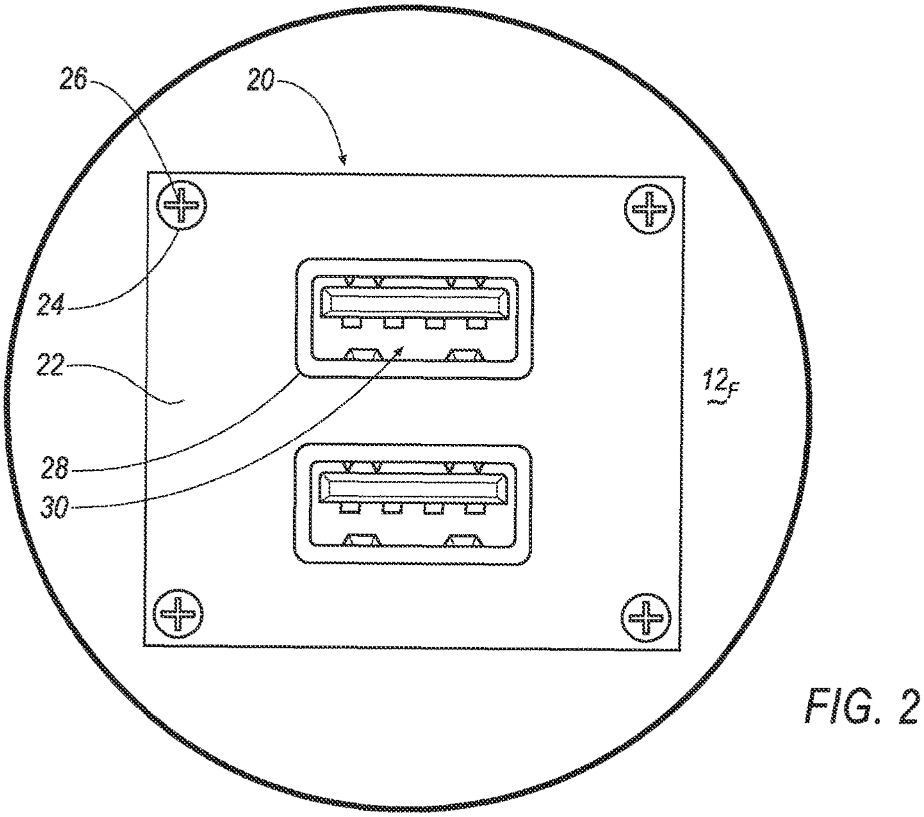
FIG. 2 is an enlarged view of the gaming device of FIG. 1 according to line 2.

Referring to FIGS. 1 and 2, the front surface portion $\mathbf{12}_F$ of the housing 12 may also include an electronic device interface 20. As seen in FIG. 2, the electronic device interface 20 may include, for example, a faceplate 22 that forms one or more fastener passages 24. The electronic device interface 20 may also include one or more fasteners 26 that are disposed within the one or more fastener passages 24 for removeably-securing the faceplate 22 to the front surface portion $\mathbf{12}_F$ of the housing 12.

The faceplate 22 may also form one or more electronic device ports 28 that contain connection hardware 30. The connection hardware 30 is directly connected to the external power source, AC.

The connection hardware 30 may include any desirable structural configuration. Further, if desired, the one or more fasteners 26 may be removed in order to permit the faceplate 22 to be removed from the front surface portion $\mathbf{12}_F$ of the housing 12 in order to, for example, replace or upgrade the connection hardware 30, if, for example, the connection hardware 30 needs to be serviced, or, for example, is obsolete. In some instances, the connection hardware 30 may include, but is not limited to: an universal serial bus (USB) type A connector, an USB type B connector, an USB type C connector, or the like.

Figure 3:
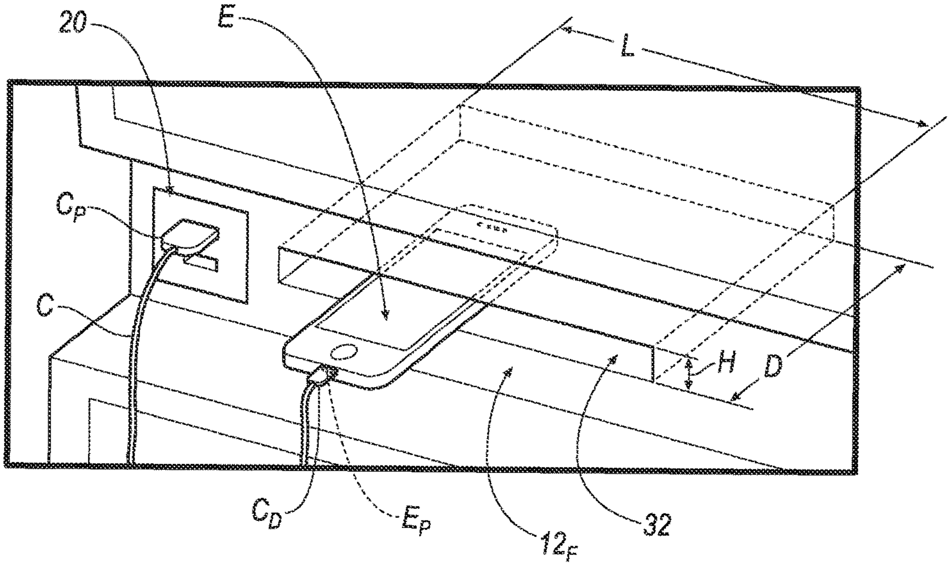
FIG. 3 is an enlarged view of the gaming device of FIG. 1 according to line 3.

Referring to FIGS. 1 and 3, the front surface portion $\mathbf{12}_F$ of the housing 12 may also define a cavity 32. As seen in FIG. 3, the cavity 32 may be arranged proximate the electronic device interface 20. The cavity 32 may be defined by a length dimension, L, a height dimension, H, and a depth dimension, D.

The length, height and depth dimensions, L, H, D, may be selectively sized to accommodate at least partial disposal of an electronic device, E (as seen in, e.g., FIGS. 1 and 3), within the cavity 32. The electronic device, E, may be associated with the patron of the gaming device 10. In some instances, the electronic device, E, may include, but is not limited to: a smart phone, a tablet computer, a digital camera or the like.

Referring to FIGS. 1 and 3, a cord is shown generally at reference letter C. The cord, C, includes a proximal end, $C_P$, and a distal end, $C_D$. As seen in FIG. 3, the proximal end, $C_P$, of the cord, C, is sized to be removably-interfaced with the connection hardware 30 of one of the one or more electronic device ports 28. As also seen in FIG. 3, the distal end, $C_D$, of the cord, C, is sized to be removeably-interfaced with a connection hardware of a port, $E_P$, of the electronic device, E.

Upon interfacing the cord, C, with each of the connection hardware 30 of one of the one or more electronic device ports 28 and the port, $E_P$, of the electronic device, E, as described above, the electronic device, E, may be selectively and removeably hardwire-connected to the electronic device interface 20 that is supported by the gaming device 10; as a result, the cord, C, permits at least, for example: the electronic device, E, to be charged by or receive power directly from the power source, AC, due to the power source, AC, being directly connected to the connection hardware 30 of the electronic device interface 20. By definition, the connection hardware 30 of one of the one or more electronic device ports 28 of the electronic device interface 20 may serve as a terminal end or extension of the power source, AC; as a result, any of: (1) the connection hardware 30, (2) the one or more electronic device ports 28 and (3) the electronic device interface 20, which is supported by the gaming device 10, may be said to be an extension of the power source, AC, that, therefore, is supported by the gaming device 10.

Figure 4:
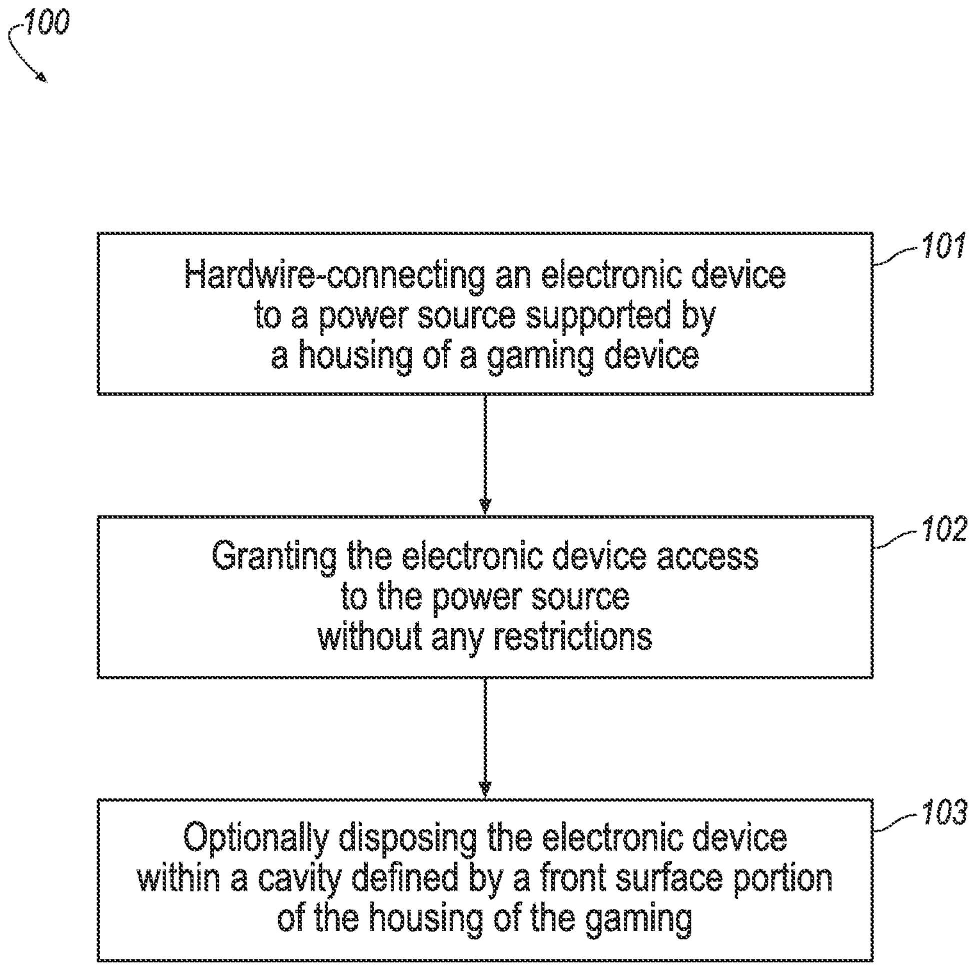
FIG. 4 is a flow diagram of an exemplary methodology associated with the gaming device of FIG. 1.

In some instances, upon selectively-hardwire-interfacing the electronic device, E, with the connection hardware 30, the power source, AC, may immediately provide power to the electronic device, E, without any restrictions (see, e.g., an exemplary method 100 of FIG. 4). In other examples, upon selectively-hardwire-interfacing the electronic device, E, with the connection hardware 30, selective access to the power source, AC, may be provided (see, e.g., an exemplary method 200 of FIG. 5).

Referring to FIG. 4, an exemplary methodology 100 for providing power from the power source, AC, to the electronic device, E, is described. The electronic device, E, is firstly selectively hardwire-connected 101 to the connection hardware 30 by, for example: (1) removeably-interfacing the proximal end, $C_P$, of the cord, C, with the connection hardware 30 of the electronic device interface 20, and (2) removeably-interfacing the distal end, $C_D$, of the cord, C, with the connection hardware of the port, $E_P$, of the electronic device, E. The battery of the electronic device, E, may then be charged by/receive power from 102 the power source, AC, without any restrictions. Optionally, the electronic device 10 may be disposed 103 within the cavity 32 that is formed in part by the front surface portion $\mathbf{12}_F$ of the housing 12.

Figure 5:
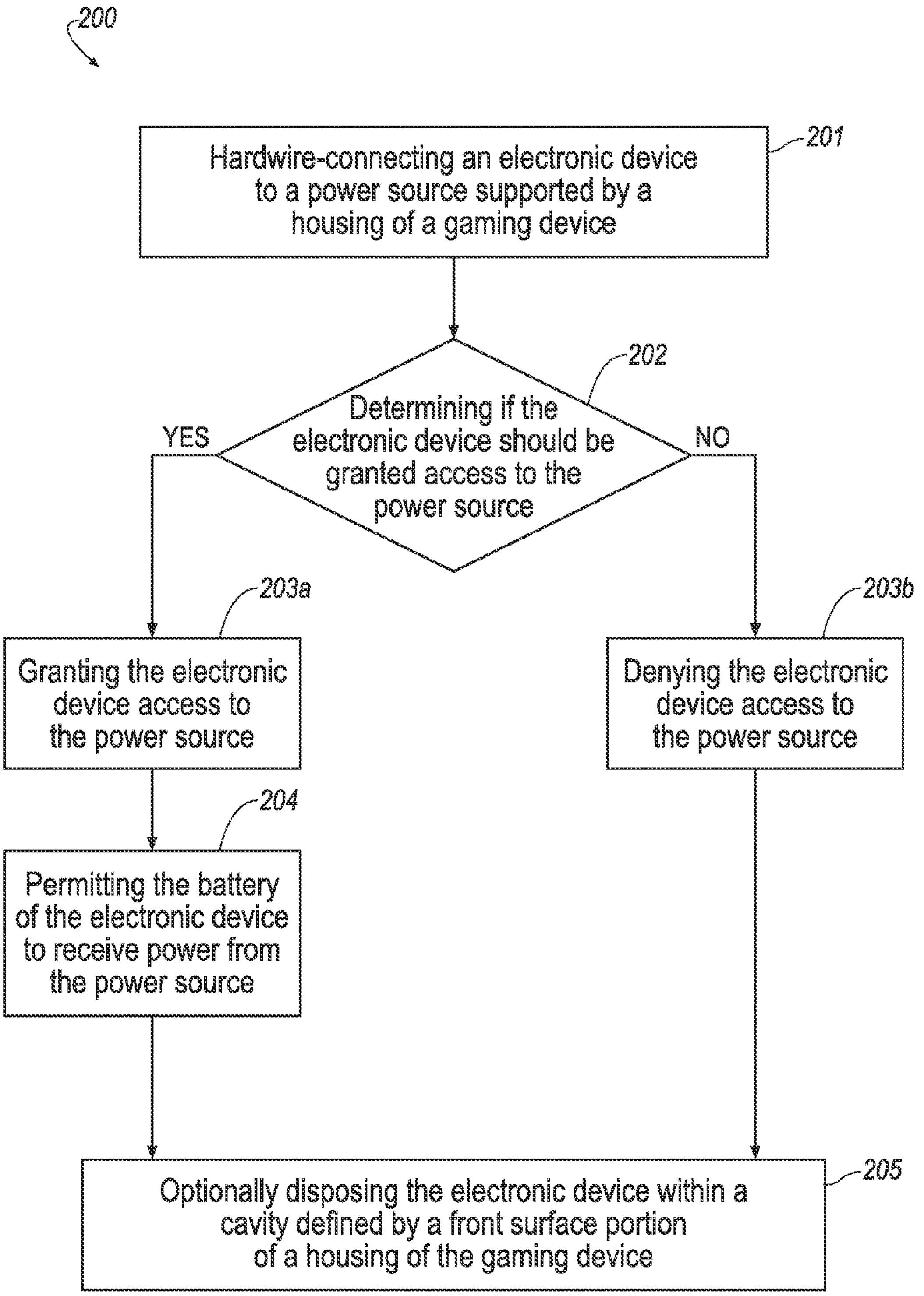
FIG. 5 is a flow diagram of another exemplary methodology associated with the gaming device of FIG. 1.

Referring to FIG. 5, an exemplary methodology 200 for providing power from the power source, AC, to the electronic device, E, is described. The electronic device, E, is firstly selectively hardwire-connected 201 to the connection hardware 30 by, for example: (1) removeably-interfacing the proximal end, $C_P$, of the cord, C, with the connection hardware 30 of the electronic device interface 20, and (2) removeably-interfacing the distal end, $C_D$, of the cord, C, with the connection hardware of the port, $E_P$, of the electronic device, E. After selectively hardwire-connecting 201 the electronic device, E, to the gaming device 10, a determination is made 202 if the electronic device, E, should be granted access to the power source, AC. The determination 202 may be arbitrated by, for example, programming or logic stored by the computing resource 75 (e.g., the computing resource 75 may be in communication with and open/close a switch 50 arranged between the connection hardware 30 and the power source, AC). When the switch 50 is closed, access to the power source, AC, is permitted; conversely, when the switch is opened, access to the power source, AC, is denied. If, for example, the determination 202 results in access to the power source, AC, being granted, the methodology 200 may be advanced from step 202 to step 203*a*; alternatively, if, for example, the determination 202 results in access to the power source, AC, being denied, the methodology 200 may be advanced from step 202 to step 203*b*.

Upon the methodology 200 being advanced to step 203*a* where access to the power source, AC, is granted, the battery of the electronic device, E, may then be charged by/receive power from 204 the power source, AC. Conversely, upon the methodology 200 being advanced to step 203*b* where access to the power source, AC, is denied, the battery of the electronic device, E, is not charged by/receive power from the power source, AC. Optionally, the electronic device 10 may be disposed 205 within the cavity 32 that is formed in part by the front surface portion $\mathbf{12}_F$ of the housing 12.

The determination step 202 may include any desirable condition, prerequisite or qualifying event. For example, the computing resource 75 may determine 202 if the magnetic strip card, MC, is or is not removeably-interfaced with the slot 18. Therefore, if the computing resource 75 determines that the magnetic strip card, MC, is removeably-interfaced with the slot 18, the methodology 200 may be advanced from step 202 to step 203*a* where the electronic device, E, is permitted access to the power source, AC; alternatively, if the computing resource 75 determines that the magnetic strip card, MC, has not been removeably-interfaced with the slot 18, the methodology 200 may be advanced from step 202 to step 203*b* where the electronic device, E, is denied access to the power source, AC.

In another example, the computing resource 75 may employ a timer to determine 202 if the patron has logged a predetermined amount of play time with the gaming device 10. Therefore, if the computing resource 75 determines that the patron has met or exceeded the predetermined amount of play time with the gaming device 10, the methodology 200 may be advanced from step 202 to step 203*a* where the electronic device, E, is permitted access to the power source, AC; alternatively, if the computing resource 75 determines that the patron has not met or exceeded the predetermined amount of play time with the gaming device 10, the methodology 200 may be advanced from step 202 to step 203*b* where the electronic device, E, is denied access to the power source, AC.

In yet another example, the computing resource 75 may employ a counter to determine 202 if the patron has wagered or lost a predetermined amount of money with the gaming device 10. Therefore, if the computing resource 75 determines that the patron has wagered or lost the predetermined amount of money with the gaming device 10, the methodology 200 may be advanced from step 202 to step 203*a* where the electronic device, E, is permitted access to the power source, AC; alternatively, if the computing resource 75 determines that the patron has not wagered or lost the predetermined amount of money with the gaming device 10, the methodology 200 may be advanced from step 202 to step 203*b* where the electronic device, E, is denied access to the power source, AC.

In yet another additional example, the computing resource 75 may employ an electronic inquiry or "handshake" to determine 202 if, for example, the patron has activated an app or software that is running on the electronic device, E; the electronic inquiry or "handshake" may be connected by exchanging data in, for example: (1) a hardwired fashion over the cord, C, or (2) in a wireless fashion via, for example, any wireless communication protocol, such as, for example, a BLUETOOTH® connection, a Wi-Fi connection, or the like between the electronic device, E, and the computing resource 75. Therefore, if the computing resource 75 determines that the patron has activated an app or software that is running on the electronic device, E, the methodology 200 may be advanced from step 202 to step 203*a* where the electronic device, E, is permitted access to the power source, AC; alternatively, if the computing resource 75 determines that the patron has not activated an app or software that is running on the electronic device, E, the methodology 200 may be advanced from step 202 to step 203*b* where the electronic device, E, is denied access to the power source, AC. In some instances, the app or software may include, for example, a digital certificate that includes information related to the patron, which may be substantially similar to information stored upon the magnetic strip of the magnetic strip card, MC, if, for example, the magnetic strip card, MC, is a reward program card, such as, for example, a "players club" card.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method, comprising:

providing a gaming device including:

- a housing having at least one outer surface at least partially forming a slot sized for receiving an identification card, and
- an electronic device interface removably-secured to the at least one outer surface of the housing, wherein the electronic device interface is directly connected to an external power source;

receiving a connector of an electronic device at the electronic device interface;

determining if the electronic device interface should be granted access to the external power source when the identification card is removably interfaced with the slot;

upon determining that the electronic device should be granted access to the power source, permitting the electronic device to receive power from the external power source; and providing power from the power source to the electronic device.

2. The method according to claim 1 wherein the at least one outer surface of the housing at least partially defines an electronic device receiving cavity that extends into the housing and disposing the electronic device within the cavity.

3. The method according to claim 1, wherein the determining step includes determining that a patron of the gaming device has logged a predetermined amount of play time with the gaming device.

4. The method according to claim 1, wherein the determining step includes determining that a patron of the gaming device has met or exceeded a predetermined amount of play time with the gaming device.

5. The method according to claim 1, wherein the determining step includes determining that a patron of the gaming device has wagered or lost a predetermined amount of money with the gaming device.

6. The method according to claim 1, wherein the determining step includes determining that a patron of the gaming device has activated an app or software that is running on the electronic device.

* * * * *